March 15, 1927.  
E. D'EVLYN  
BAKING PAN  
Filed May 20, 1925

1,621,315

Inventor:
Elizabeth D'Evlyn
By Fred Gerlach
his Atty.

Patented Mar. 15, 1927.

1,621,315

UNITED STATES PATENT OFFICE.

ELIZABETH D'EVLYN, OF CHICAGO, ILLINOIS, ASSIGNOR OF ONE-HALF TO EARL J. BROWN, OF CHICAGO, ILLINOIS.

BAKING PAN.

Application filed May 20, 1925. Serial No. 31,480.

The invention relates to baking pans.

In baking pies in pans, or other foods, containing fruit or juice, it frequently occurs that during the baking the juice runs over the margin of the pan, and drops into the oven. In order to remove the overflow, it is necessary to clean the oven.

The object of this invention is to provide an improved device for catching the overflow, so that it will not soil the oven.

The invention consists in the several novel features hereinafter set forth and more particularly defined by claims at the conclusion hereof.

Figure 1:
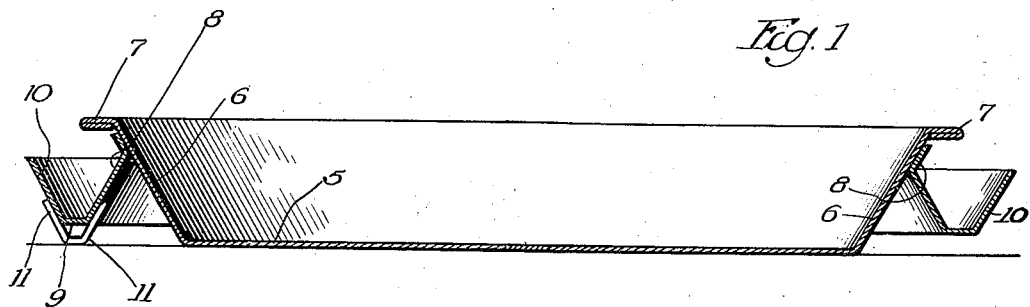
Figure 2:
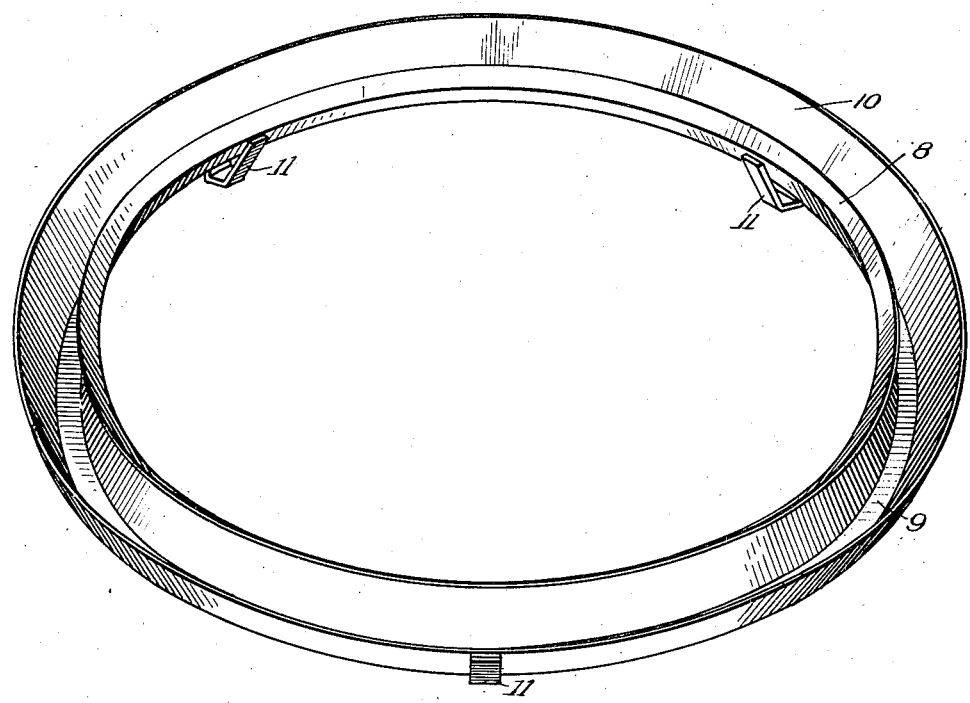
Figure 3:
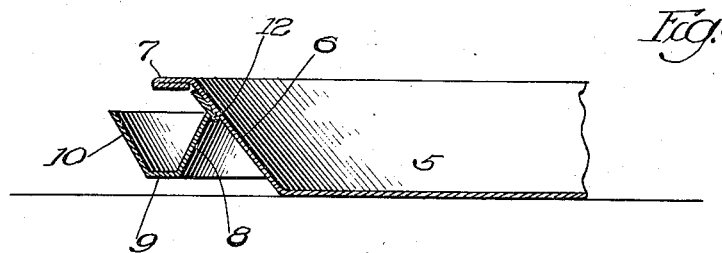

In the drawings: Fig. 1 is a section through a pie pan provided with the invention. Fig. 2 is a detail of the trough ring for catching the overflow from the pan. Fig. 3 is a section of a modified form of the invention.

The invention is exemplified for use with a pie pan of usual construction, and comprising a body 5, a sloping side 6 and a rim 7. The sheet metal ring comprises an inner wall 8, a bottom 9 and an upwardly and outwardly extending outer wall 10. The upper margin of the wall 8 is flared or formed to fit snugly against the outer side of the pie pan. The walls of the ring form a trough 11, which underlies the rim 7, so that all overflow from the pan will drop into and be retained in this trough. In the form of the invention shown in Figs. 1 and 2, the trough ring is separately formed and separable from the pie pan, so the pan and ring may be separately removed from the oven or so the ring may be separated from the pan for convenience in cleansing. Legs 11, formed of strips of metal, are soldered to the ring to support it above the oven floor and the bottom of the pie pan, to permit the heat to circulate around the side wall of the pie pan.

In the form of the invention shown in Fig. 3, the trough ring, in lieu of being provided with legs 11, is soldered at 12, to the wall 6 of the pie pan, so that it will be permanently attached to the pie pan.

The invention exemplifies a simple and efficient device for catching the overflow from pans, so that the soiling of the oven is prevented. This construction is of particular advantage in baking fruit pies, in which the juice usually overflows the rim of the pie. The trough ring is formed so that it underlies the rim 7, so that the use of the rim for trimming the pies will not be interfered with. The device is simple in construction and can be produced at a low cost.

In the preferred form of the invention, exhibited in Figs. 1 and 2, the ring is separable from the pan, so that one ring may be applied to different pans and for convenience in cleansing the trough ring.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a pie pan comprising a bottom, an upwardly flared side, and an annular rim projecting outwardly from the top of the side, of a sheet metal ring comprising an upwardly and outwardly flared annular wall conforming to and fitting snugly against the side wall of the pan beneath the rim, an annular outer side-wall and a bottom, the side wall of the ring being extended to project outwardly of the margin of the rim of the pan.

2. The combination with a pie pan comprising a bottom, an upwardly flared side, and an annular rim projecting outwardly from the top of the side, of a sheet metal ring comprising an upwardly and outwardly flared annular wall conforming to and fitting snugly against the side wall of the pan beneath the rim, an annular outer side wall and a bottom, the side wall of the ring being extended to project outwardly of the rim of the pan, and sheet metal loops attached to and depending from the ring to support it.

Signed at Chicago, Illinois, this 4th day of May, 1925.

ELIZABETH D'EVLYN.